(12) United States Patent
Spragg et al.

(10) Patent No.: US 6,470,937 B1
(45) Date of Patent: Oct. 29, 2002

(54) RUN FLAT PNEUMATIC TIRE AND ANTICLASTIC BAND ELEMENT THEREFOR

(75) Inventors: Charles D. Spragg, Hudson, OH (US); Stephen M. Vossberg, Medina, OH (US); James M. Kirby, Akron, OH (US); Edward G. Markow, Jensen Beach, FL (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 18 days.

(21) Appl. No.: 09/678,048

(22) Filed: Oct. 3, 2000

(51) Int. Cl.$^7$ .............................. B60C 9/00; B60C 17/00
(52) U.S. Cl. ..................... 152/516; 152/526; 152/533
(58) Field of Search ................................ 152/516–518, 152/526, 538, 527, 533

(56) References Cited

U.S. PATENT DOCUMENTS

| | | |
|---|---|---|
| 1,411,516 A | 4/1922 | Reider |
| 2,017,071 A | 10/1935 | Minor ............................ 18/59 |
| 3,842,885 A | 10/1974 | Alban ...................... 152/361 R |
| 3,850,219 A | 11/1974 | Snyder ................ 153/361 DM |
| 3,933,566 A | 1/1976 | Seiberling ................... 156/272 |
| 4,094,354 A | 6/1978 | Ferrell et al. ............ 152/361 R |
| 4,111,249 A | 9/1978 | Markow ............... 152/330 RF |
| 4,167,429 A | 9/1979 | Ackley |
| 4,287,924 A | 9/1981 | Deck et al. .................. 152/153 |
| 4,318,434 A | 3/1982 | Markow ..................... 152/156 |
| 4,428,411 A | 1/1984 | Markow et al. ....... 152/330 RF |
| 4,456,048 A | 6/1984 | Markow et al. ....... 152/330 RF |
| 4,459,167 A | 7/1984 | Markow et al. ......... 156/110.1 |
| 4,463,044 A | 7/1984 | McKinney |
| 4,673,014 A | 6/1987 | Markow ..................... 152/156 |
| 4,734,144 A | 3/1988 | Markow ..................... 156/123 |
| 4,794,966 A | 1/1989 | Markow ..................... 152/516 |
| 4,989,658 A | 2/1991 | Maathuis et al. ........... 152/533 |
| 5,078,191 A | * 1/1992 | Tamura ....................... 152/454 |
| 5,368,082 A | 11/1994 | Oare et al. .................. 152/517 |
| 5,427,166 A | 6/1995 | Willard, Jr. .................. 152/454 |
| 5,795,417 A | 8/1998 | Damke et al. .............. 152/527 |
| 5,879,484 A | 3/1999 | Spragg et al. .............. 152/516 |

FOREIGN PATENT DOCUMENTS

| | | |
|---|---|---|
| EP | 85106488 | 5/1985 |
| EP | 0 191 124 | 8/1986 |
| EP | 0 400 859 | 5/1990 |
| EP | 0 537 780 | 4/1993 |
| EP | 0 853 009 A2 | 11/1997 |
| EP | 0 953 436 A2 | 11/1999 |
| EP | 0 974 449 A3 | 4/2000 |
| EP | 1 010 549 A2 | 6/2000 |
| JP | 63141809 | 12/1986 |

OTHER PUBLICATIONS

Derwent Abstract of EPO Publication 0 191 124.
**Derwent Abstract provides English lanugage explantation per 37 CFR 1.98(a)(3).

* cited by examiner

Primary Examiner—Michael W. Ball
Assistant Examiner—Justin Fischer
(74) Attorney, Agent, or Firm—Michael Sand; John M. Vasuta; Fred H. Zollinger, III

(57) ABSTRACT

A run flat pneumatic tire has a thin annular band embedded in the crown portion of the tire. The band is formed of a composite material such as tows of fiberglass and/or graphite material impregnated with a resin. The resin coated tows are wound about a mandrel having at least one concave recess to provide the band with an anticlastic shape with an arcuate cross section and a concave surface facing radially outwardly.

12 Claims, 5 Drawing Sheets

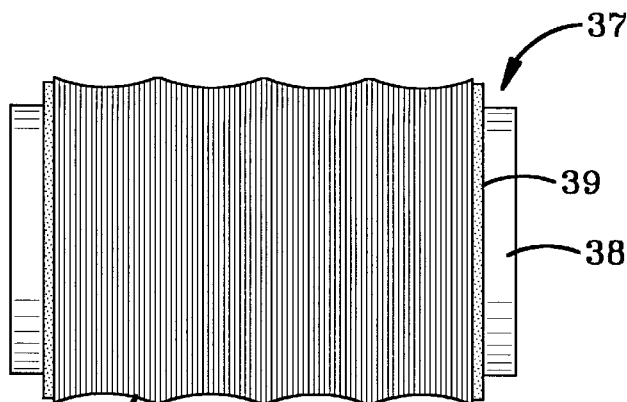 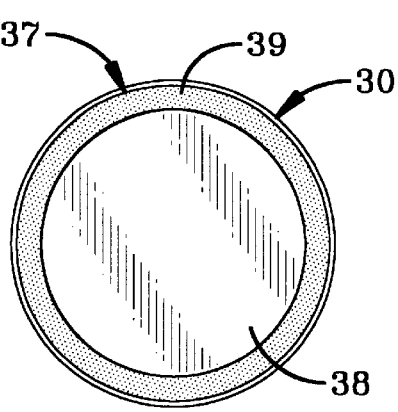
FIG-10  FIG-10A
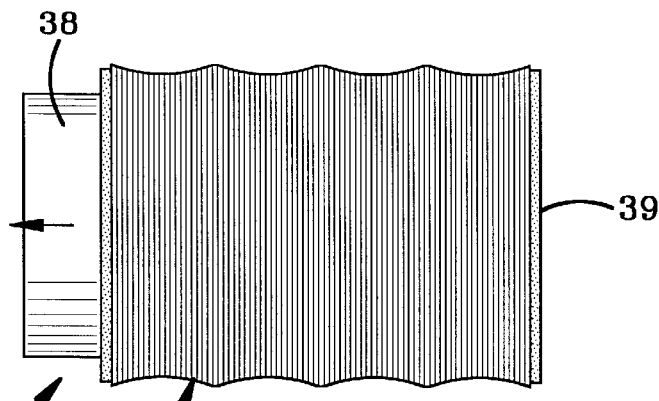 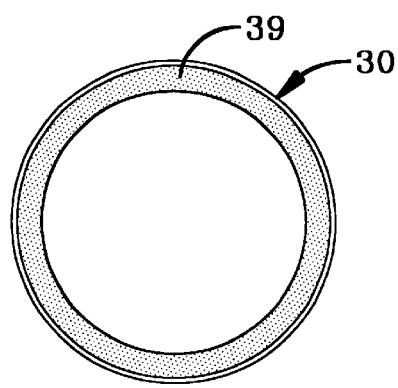
FIG-11  FIG-11A
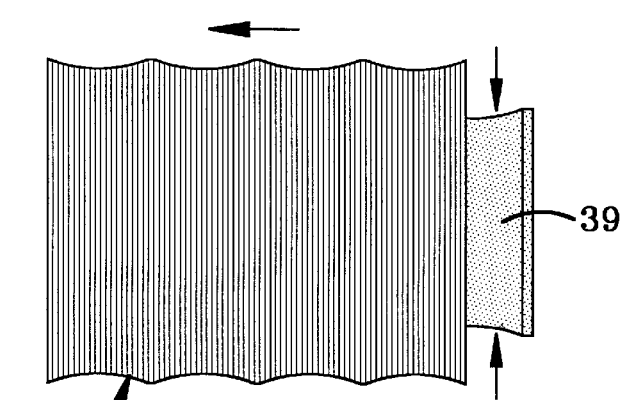 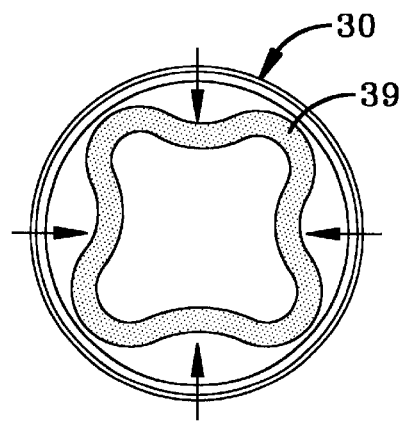
FIG-12  FIG-12A

RUN FLAT PNEUMATIC TIRE AND ANTICLASTIC BAND ELEMENT THEREFOR

BACKGROUND OF THE INVENTION

1. Technical Field

The invention relates to vehicle tires and particularly to a run flat pneumatic tire containing a thin annular band which acts as a structural compression member when the tire is in the unpressurized or uninflated state to enable the tire to run in this condition. More particularly, the invention relates to a composite band element comprising a plurality of wound fibers contained in a resin matrix formed about a mandrel and which has an anticlastic shape with a concave surface facing radially outwardly to enhance inflated tire ride quality and band element durability for both inflated and uninflated conditions.

2. Background Information

Various tire constructions have been devised over the years which enable a tire to run in an under-inflated or non-inflated condition, such as after receiving a puncture and loss of pressurized air for extended periods of time and at relatively high speeds. This enables the operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the side walls of the tire which enable the tire to support the vehicle weight even with the complete loss of internal air pressure. Examples of such prior art run flat tire constructions which use such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164; and 4,929,684.

In addition to these prior art run flat tires having side wall reinforcements, various run flat tire constructions have been developed which utilize a thin annular band which extends circumferentially throughout the tire beneath the tread area in the crown portion of the tire. Examples of such banded run flat tires are shown in U.S. Pat. Nos. 4,111,249; 4,318, 434; 4,428,411; 4,459,167; 4,734,144; 4,428,411; 4,673, 014; 4,794,966; and 4,456,048.

Banded tires have been fabricated with band materials made of steel, aluminum, titanium, and epoxy and thermoplastic composites with glass, KEVLAR (aromatic polyamide) and graphite fiber reinforcement. A possible failure mode with these lightweight, laminated band constructions is interlaminar shear along the band's primary bending neutral axis. This is a fatigue failure and is directly related to the spectrum of cyclic operating stress. As in all fatigue failures, the lower the stress, the longer the operating life.

The inflated ride quality, comfort and harshness of a banded run flat tire is effectively controlled by the circumferential rigidity and bending stiffness of the band element within the central footprint region. The circumferential rigidity necessary for the band element to adequately carry tire loads in both the inflated and uninflated conditions, is largely determined by the bending stiffness of the band element ahead of and behind the central footprint region. It is desirable that the band element have variable axial bending stiffness in order to improve inflated ride quality, comfort and less hardness with the load carrying durability of the band element being improved by providing higher axial bending stiffness ahead of and behind the central footprint region. Likewise, it is desirable that the band element also has increased interlaminar shear strength and increased circumferential strength or stiffness in order to reduce failure of the band.

It has been found that band elements having dual stiffness characteristics have been effective in achieving a better run flat tire. A dual stiffness band has variable axial bending stiffness with a lower axial bending stiffness in the central footprint region which improves inflated ride quality, comfort and harshness, yet provides a higher axial bending stiffness ahead of and behind the central footprint region in order to provide the necessary band durability and load carrying capacity. Numerous band element configurations have been disclosed in the prior art which provide for a dual modulus result. One such band configuration for providing the dual modulus effect is to use a band element having an anticlastic shape such as shown in U.S. Pat. No. 4,456,084. An anticlastic band has an arcuate cross section with an outwardly concave configuration and under load will deform so as to have a lower section modulus where the band flattens out in the central footprint region and a more stable section modulus due to elastic deformation where the band radius of curvature is decreasing ahead of and behind the central footprint region. This movement of the instant flexural center is similar to what one sees in an extended curved section measuring tape, concave up vs. concave down. The prior art anticlastic band of U.S. Pat. No. 4,456,084 is formed of sheet metal material which was found to be extremely difficult to form into the anticlastic shape. It required complex fabrication in that the sheet material had to be rolled into the anticlastic shape and then the ends secured by some type of welding. Both of these fabrication procedures are difficult to perform in order to achieve a uniform band configuration. Likewise, the sheet metal material had to be hardened by heat treating, straining or other similar metallurgic techniques to achieve the desired strength.

SUMMARY OF THE INVENTION

In summary, the present invention provides a run flat tire and in particular a band element therefor, which has both increased interlaminar shear strength and which provides for a dual stiffness effect when the tire is operating both in the inflated and deflated conditions by providing an anticlastic band formed of a composite material.

Another feature is to provide a band element for a run flat pneumatic tire which is formed of a composite material from various types of fibers, preferably graphite, fiberglass or a combination of both, which fibers are encased in a resin matrix and provided with an anticlastic configuration to provide a dual stiffness band. The term "anticlastic" is defined as a double curved shape where the surface curve is concave in one direction and convex in another. This dual stiffness provides an improved ride quality and comfort by having a lower axial bending stiffness in the central footprint region of the tire and provides the required durability and strength by providing a higher axial bending stiffness in the band ahead of and behind the central footprint region as the tire rotates.

Another aspect of the invention is to provide a band formed of wound layers of resin impregnated fiber tows which form a plurality of layers providing generally axial extending concave surfaces between the layers within the band, which surfaces cross the neutral axis of the band due to the curvature of the band, thereby increasing interlaminar shear strength.

Still another aspect of the invention is providing the anticlastic band in which the concavity thereof is within the range of 1/10 to twice the band thickness, and in the preferred embodiment forming the concavity to equal the band thickness.

A further aspect of the invention is to enable the band to be fabricated by usual methods of fabrication available for prior composite band elements, such as homogenous filament winding, nonhomogenous filament winding, multilayer tape composite winding, winding with preimpregnated materials, winding with wet woven materials, winding with mats, winding with resin transfer molding processes, winding with wet or preimpregnated woven preforms, and combinations of these prior known composite band forming techniques and methods of fabrication.

Another feature of the invention is to provide a band element formed of composite material which allows tailoring of both stresses and elastic deflection properties by controlling orientation of the fibers and selection of fiber modulii dependent upon the type of material chosen instead of the prior art sheet metal fabrication which is limited to the isotropic material properties of the metal.

Still another aspect of the invention is to provide an anticlastic band which is lighter in weight than prior sheet metal anticlastic bands, which is considerably easier to manufacture and is free of undesirable splices thereby eliminating possible undesirable irregularities in the band.

A further aspect of the invention is the ability to improve the processing and manufacturing of the anticlastic shape by use of various methods of forming the band on mandrels either collapsible or deformable, to enable the non-cylindrical shape of the band to be formed and then removed from a cylindrical mandrel.

Further advantages, construction and operation of the present invention will become more readily apparent from the following description and accompanying drawings.

BRIEF DESCRIPTION OF THE DRAWINGS

FIG. 10 is a diagrammatic view showing another embodiment of a mandrel for forming a plurality of the band elements;

FIG. 10A is an end view of FIG. 10;

FIG. 11 is a view similar to FIG. 10 showing the inner mandrel being removed;

FIG. 11A is an end view of FIG. 11;

FIG. 12 is a view showing the flexible outer shell of FIGS. 10 and 11 being distorted for removal of the elongated corrugated sleeve therefrom; and FIG. 12A is an end view of FIG. 12.

Similar numerals refer to similar parts throughout the drawings.

DESCRIPTION OF THE PREFERRED EMBODIMENTS

Figure 1:
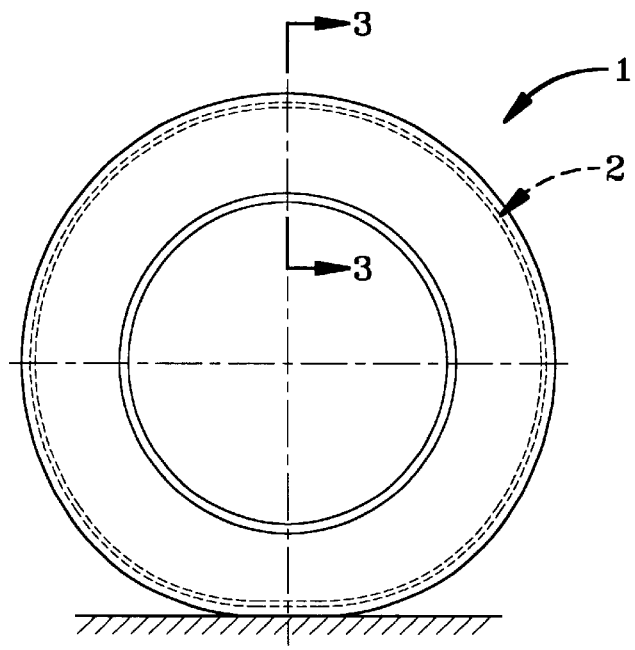
FIG. 1 is a side elevational view of pneumatic tire containing the improved band element.
Figure 3:
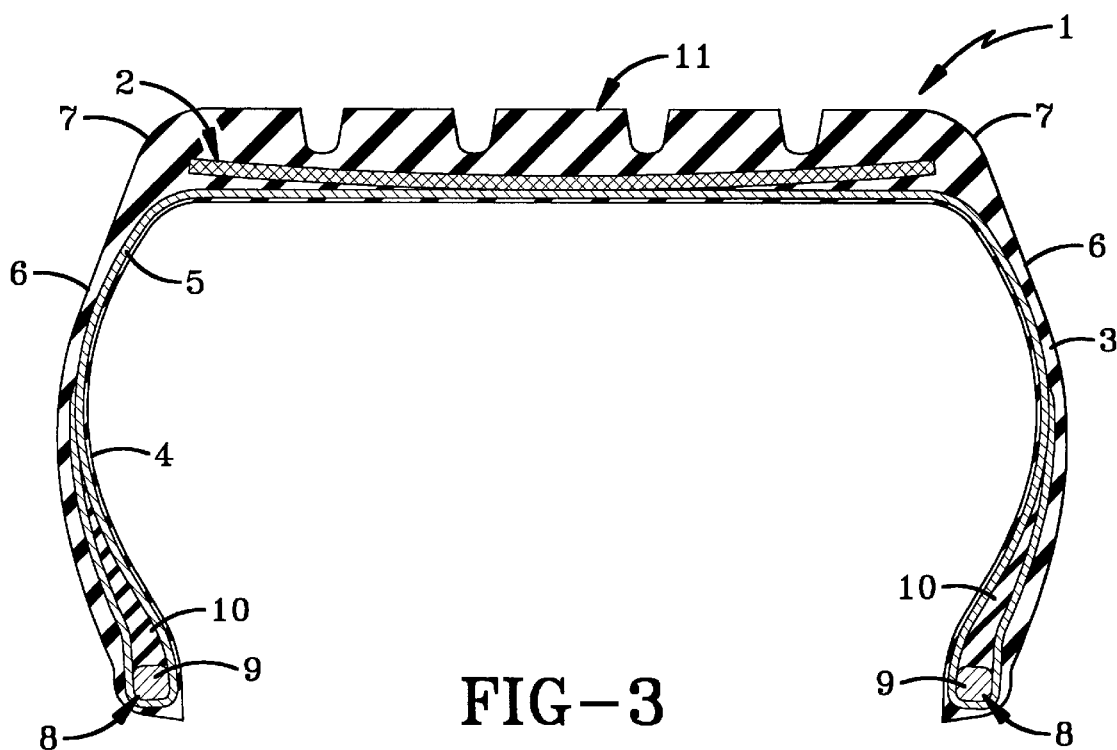
FIG. 3 is an enlarged sectional view taken along lines 3—3, FIG. 1.

FIG. 1 is a diagrammatic side elevation of a pneumatic tire indicated generally at 1, having the improved run flat band indicated generally at 2, incorporated therein. Tire 1 is of a usual construction and includes a body ply carcass 3 (FIG. 3) consisting of an innerliner 4, at least one body ply 5, and sidewalls 6 extending from a crown portion 7 of the tire to bead packages 8. Bead packages 8 will typically include a bead 9 and a bead filler 10, and may have gum abrasion strips and other components therein, all of which are well known in the tire building art. Body ply carcass 3 is assembled and then molded with a typical tread package 11 which will usually contain a tread strip and various reinforcing belts (not shown) contained therein. Band 2 is molded into the crown portion of the tire between tread package 11 and carcass 3 in a usual tire mold. Bead packages 8 are adapted to be seated with a usual airtight seal on a vehicle rim.

Figure 2:
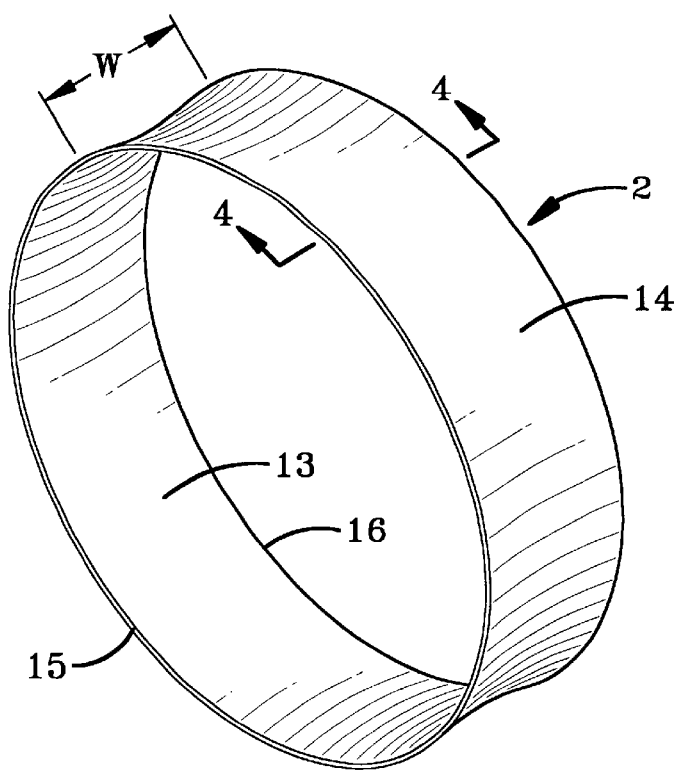
FIG. 2 is an enlarged perspective view of the anticlastic band element removed from the tire of FIG. 1.
Figure 4:
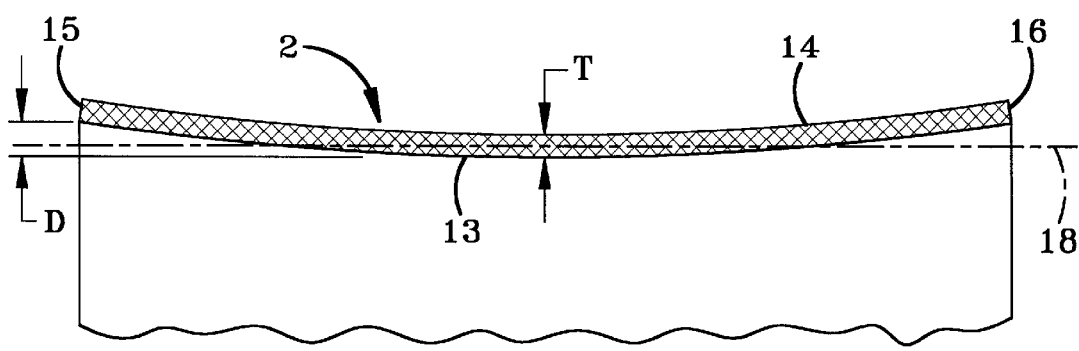
FIG. 4 is an enlarged sectional view taken along line 4—4, FIG. 2.

Band 2 (FIGS. 2 and 4) has a thin annular uniform configuration with a convex inner surface 13 and a concave outer surface 14, and has end edges 15 and 16. The band has a uniform thickness T measured between inner and outer surfaces 13 and 14 as shown particularly in FIG. 4. Band 2 has an anticlastic shape with an arcuate cross section and concave outer surface 14 facing radially outwardly. The extent of concavity is indicated at D (FIG. 4) and ranges between about 0.1 to about 2.0 times the band thickness T with the preferred concavity D being substantially equal to thickness T. As the band concavity increases, the amount of tread rubber and ultimately tire weight increases proportional to the concavity. Thus, the limits set forth above is economically the most feasible and has been found to provide the desired ride characteristics and run flat capability.

Another important feature provided by the anticlastic configuration is that the neutral axis indicated by dot-dash line 18 (FIG. 4A) is not parallel to planes 19 which are formed between the individual layers 20 resulting from the fabrication of the band as described further below. This relationship greatly increases the interlaminar shear strength by the various fibers of the composite materials crossing over the neutral axis, such as shown and described in pending U.S. application Ser. No. 09/120,210, filed Jul. 21, 1998.

Figure 4A:
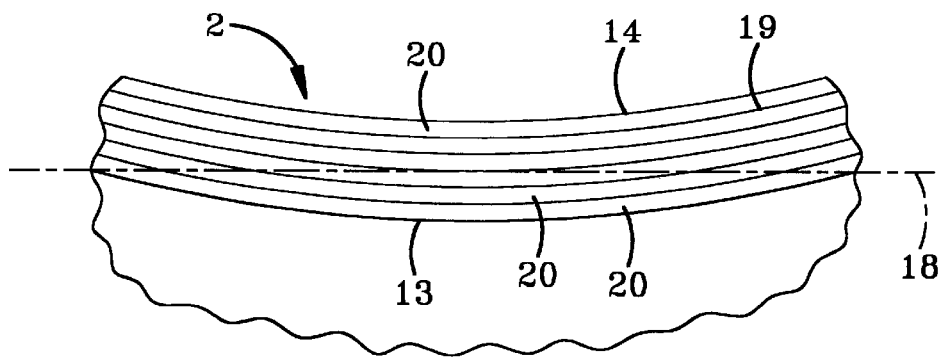
FIG. 4A is a further enlarged sectional view similar to FIG. 4, showing the layers of wound material forming the composite band and the neutral axis of the band passing therethrough.

FIG. 4A shows that band 2 is formed by a plurality of individual layers formed radially one on top of the other, each layer preferably being formed by the helical wrapping of fiber tows 21 around a mandrel as described further below. FIG. 4A shows that each layer 20 forms a plurality of adjacent generally concave planes 19 therebetween which heretofore provided an area susceptible to interlaminar shear. However, the concave configuration of the band shows that the neutral axis 18 extends across the individual planes or adjacent surfaces formed between the individual layers of fiber tows, thus greatly reducing the possibility of interlaminar shear.

Preferred methods of producing band 2 are shown diagrammatically in FIGS. 5–12A. In accordance with the invention, composite band 2 is formed of fiber tows 21 preferably formed of fiberglass or graphite or a combination thereof. Other types of synthetic fibers could be utilized without affecting the concept of the invention but fiberglass and graphite are the two preferred fibers. This enables tailoring of both stresses and elastic deflection properties of the band due to the controlled orientation and type of fibers utilized since the fiber modulii for fiberglass is from $6 \times 10^6$ psi up to $45 \times 10^6$ psi ($4.1 \times 10^{10}$ N/m$^2$ to $3.1 \times 10^{11}$ N/m$^2$) for high modulus graphite. Thus, various properties can be achieved for the band by the selection of the particular fibers used for forming the composite band instead of being limited to the isotropic material properties of a selected metal.

Figures 5, 5A:
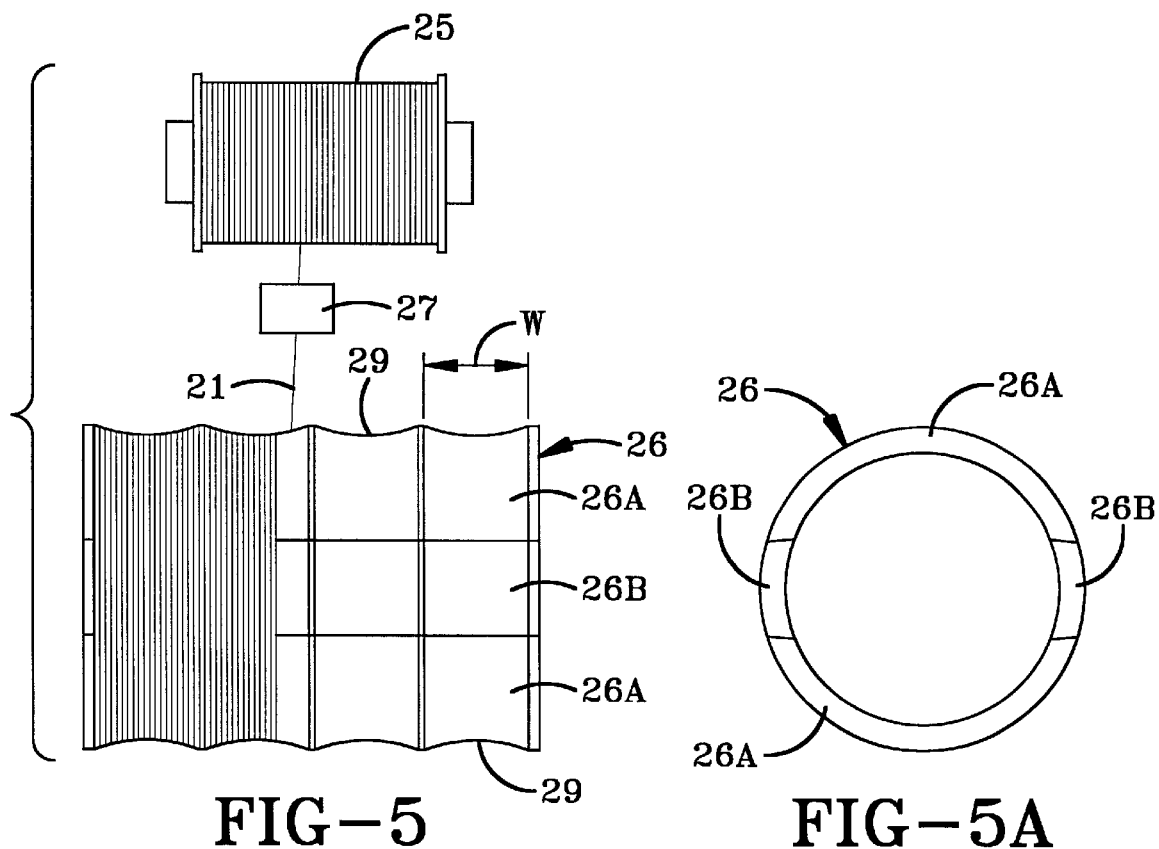
FIG. 5 is a diagrammatic view showing one method of forming the anticlastic run flat band on a collapsible mandrel.
FIG. 5A is an end view of the mandrel of FIG. 5.
Figures 6, 6A:
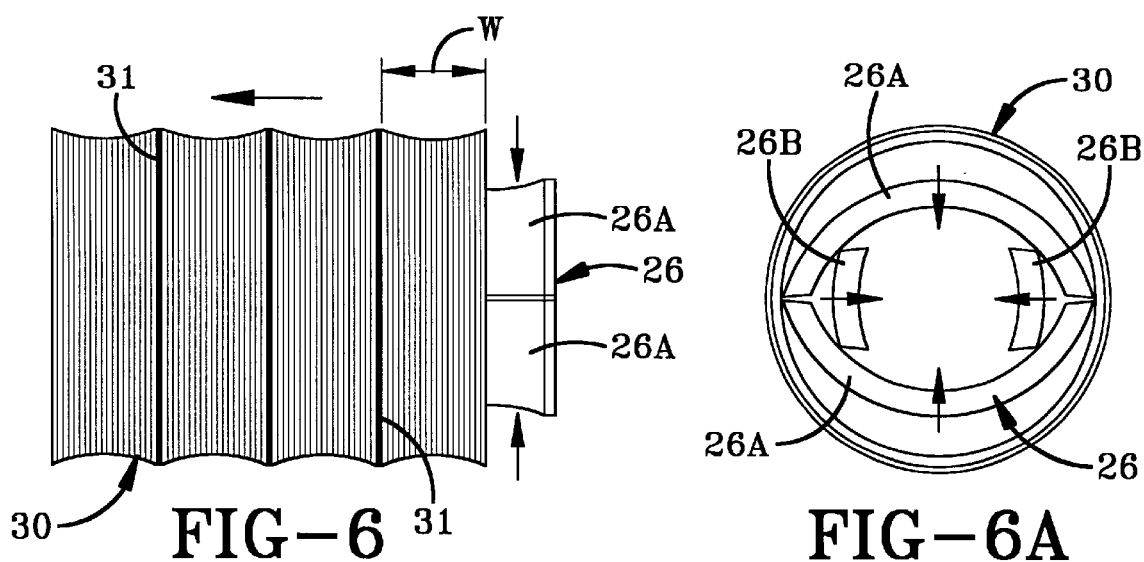
FIG. 6 is a diagrammatic elevational view showing the mandrel of FIG. 5 being collapsed and an elongated corrugated sleeve containing a plurality of integrally connected anticlastic bands being removed therefrom.
FIG. 6A is an end view of FIG. 6.
Figures 7, 7A:
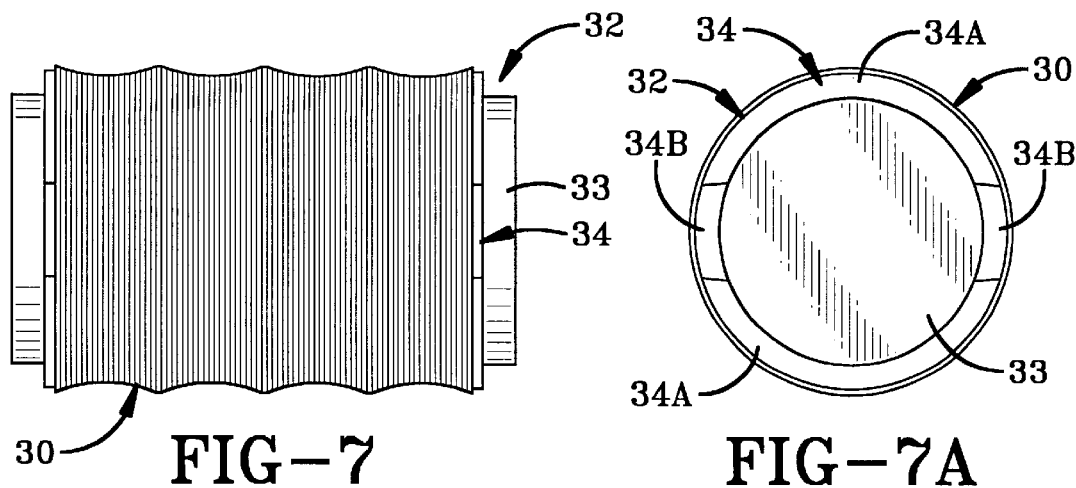
FIG. 7 is a diagrammatic view showing another type of mandrel for forming a plurality of the anticlastic run flat bands.
FIG. 7A is an end view of FIG. 7.

FIGS. 5–6A show a first method and apparatus for forming band 2 wherein a supply reel 25 contains fiber tow 21 which is wound about a mandrel 26 after passing through a liquid supply or bath 27 of resin material for coating the tow with resin. Mandrel 26 is formed by a plurality of elongated arcuate sections indicated at 26A and 26B (FIG. 5A), each being formed with a plurality of concave recesses 29 spaced axially along the mandrel which provides mandrel 26 with an elongated corrugated configuration. Each recess 29 preferably has an axial width W, which is approximately equal to the axial width of an individual band 2. After the desired number of layers 20 are formed on mandrel 26 by helically winding tow 20 thereabouts at a winding angle of ±85° to ±75°, one or both of the smaller arcuate sections 26B are collapsed inwardly as shown in FIGS. 6A, enabling the elongated corrugated sleeve 30 formed by a plurality of integrally connected concave annular sections can then be slid easily from the mandrel. Before removing sleeve 30 from mandrel 26, it is cured in a heated environment in order to solidify and form a solid resin matrix in which the resin tows are encased. The resin preferably is of a type of thermoplastic or thermoset material so that it readily solidifies when subjected to a heated environment. After removal of the solidified corrugated sleeve 30 from the mandrel, individual bands 2 are cut from the sleeve as shown by cut lines 31 in FIG. 6.

Figures 8, 8A:
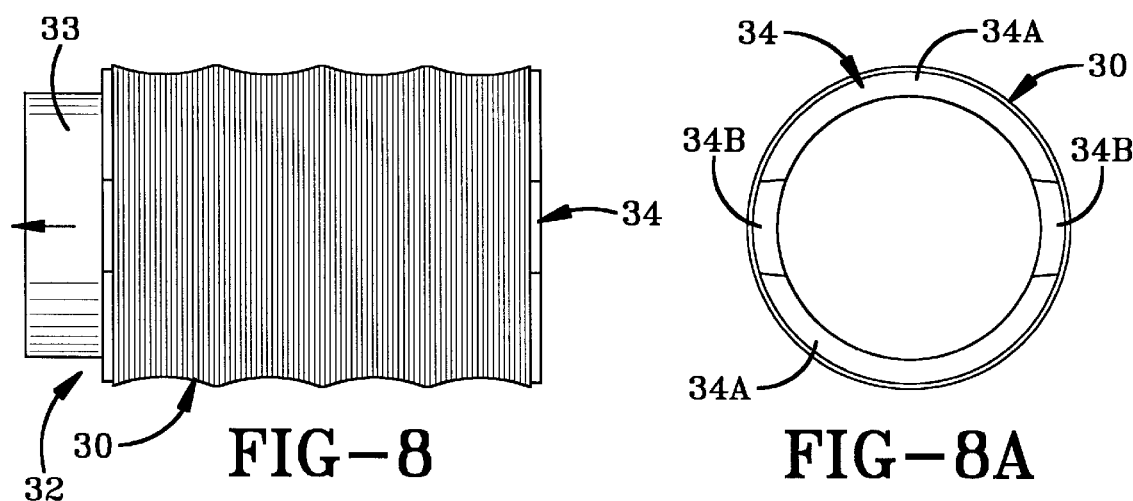
FIG. 8 is a view similar to FIG. 7 showing the inner solid cylindrical mandrel being removed from the outer shell on which the corrugated composite sleeve has been formed.
FIG. 8A is an end view of FIG. 8.
Figures 9, 9A:
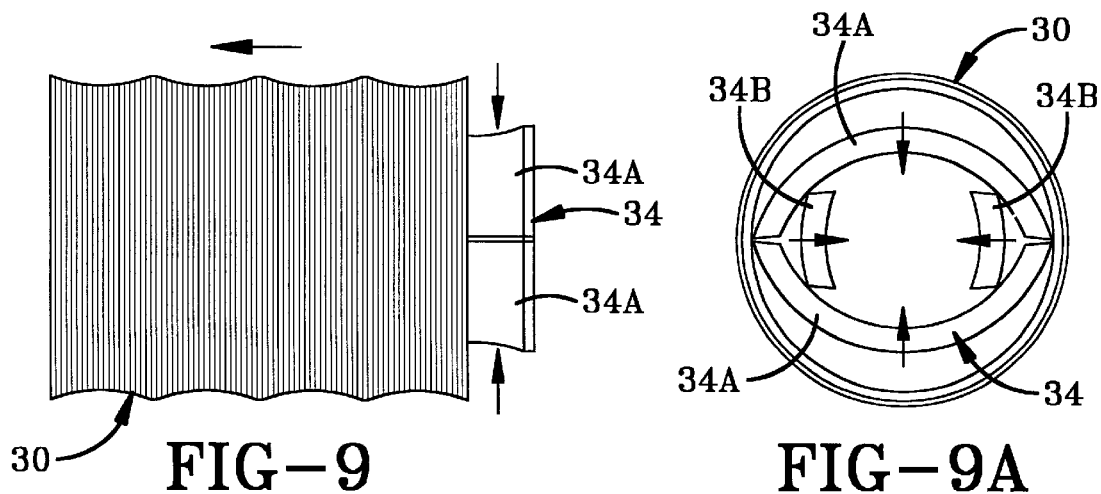
FIG. 9 is a view similar to FIG. 8 showing outer shell being collapsed and the elongated sleeve being removed therefrom.
FIG. 9A is an end view of FIG. 9.

Another method and mandrel structure for forming a plurality of bands 2 is shown in FIGS. 7–9A. A mandrel assembly indicated generally at 32, on which the resin impregnated fiber tow 21 is wound, consists of a non-collapsible inner cylindrical mandrel 33 and an outer shell 34. Shell 34 is formed by a plurality of arcuate sections 34A and 34B which are collapsed as shown in FIG. 9A in a similar manner to that described above for mandrel 26, after inner mandrel 33 is slidably removed from the interior of outer shell 34 as shown in FIG. 8. After removal of inner mandrel member 33, outer shell 34 can then be collapsed as shown in FIG. 9A for removal of elongated sleeve 30 therefrom as shown in FIG. 9.

Another mandrel assembly and method of forming band 2 is shown in FIGS. 10–12A. Sleeve 30 is formed on a mandrel assembly indicated generally at 37, which consists of an inner non-collapsible cylindrical mandrel 38 and an outer shell 39. Outer shell 39 is formed of a resilient material such as an elastomer or silicone, which after removal of inner mandrel member 38 as shown in FIG. 11, can then be distorted or collapsed due to its flexibility as shown in FIG. 12A enabling the corrugated shaped sleeve 30 to be easily removed therefrom since the effective diameter of shell 39 is reduced below the minimum inner diameter between the roots of corrugated sleeve 30. Again, after or before removal of corrugated sleeve 30, individual bands 2 are severed therefrom.

Thus, in accordance with the invention, a plurality of bands 2 having the anticlastic configuration can be formed economically on a mandrel as shown in FIGS. 5–12A, without major modifications to the heretofore forming of cylindrical composite bands on a cylindrical mandrel. Likewise, if desired, a second reel (not shown) similar to reel 25, could wind another type of fiber tow on the mandrel as shown in FIG. 5, to provide composite sleeve 30 being formed of two or more different types of fiber tows, such as fiberglass and graphite in a single operation.

It is readily understood that composite sleeve 30 is separated easily into individual bands 2 by cutting transversely along the high points of the series of wave-like corrugations of sleeve 30. Likewise, the amount of concavity is easily regulated by providing the outer surface or covering shell of the mandrel with the desired amount of concavity. Also, by merely changing the outer shell 34 and/or 39, while using the same interior mandrel 33, various band concavities can be achieved without major modification to the winding mandrel and associated fiber supply reels and resin bath.

In summary, the improved run flat pneumatic tire and band element therefor enables a dual modulus anticlastic configured band to be produced with various characteristics depending upon the type of fibers used for forming the composite band, and that it enables the neutral axis of the outwardly concave band element to cross the planes resulting from layering of the fiber tows during fabrication, thus greatly increasing interlaminar shear strength.

While the embodiments of the invention have been described, the invention is not limited thereto.

What is claimed is:

1. A run flat pneumatic tire including an elastomeric casing with a tread formed in a crown portion thereof and sidewalls extending from the crown portion to beads for seating said tire on a wheel; and a thin annular resilient band formed of a composite material having an anticlastic shape with an arcuate cross section and a concave surface facing radially outwardly embedded in the crown portion of the tire, said band having a radial thickness "T" and a concavity within the range of about 0.1 to about 2.0 times the thickness "T".

2. The pneumatic tire defined in claim 1 in which the composite material is a multilayer composite formed of wound layers of material impregnated with a heat solidifiable resin.

3. The pneumatic tire defined in claim 2 in which the resin is a thermoplastic or thermosetting material.

4. The pneumatic tire defined in claim 2 wherein the wound layers of material are formed of fiberglass or graphite or a combination of both.

5. The pneumatic tire defined in claim 4 wherein the wound layers of material form a plurality of generally axially extending radially adjacent concave surfaces within the band.

6. The pneumatic tire defined in claim 5 wherein the band has an axial width and a radial thickness with a neutral axis crossing a plurality of the planes resulting from layering the wound materials.

7. The pneumatic tire defined in claim 1 in which the concavity is substantially equal to the thickness "T".

8. A run flat pneumatic tire including an elastomeric casing with a tread formed in a crown portion thereof and sidewalls extending from the crown portion to beads for seating said tire on a wheel; and a thin annular resilient band formed of a composite material having an anticlastic shape with an arcuate cross section and a concave surface facing radially outwardly embedded in the crown portion of the tire, said composite material being a multilayer composite formed of wound layers of material impregnated with a heat solidifiable resin, said layers being helically wound at an angle of between ±85° and ±75°.

9. The pneumatic tire defined in claim 8 in which the resin is a thermoplastic or thermosetting material.

10. The pneumatic tire defined in claim 8 wherein the wound layers of material are formed of fiberglass or graphite or a combination of both.

11. The pneumatic tire defined in claim 10 wherein the wound layers of material form a plurality of generally axially extending radially adjacent concave surfaces within the band.

12. The pneumatic tire defined in claim 11 wherein the band has an axial width and a radial thickness with a neutral axis crossing a plurality of the planes resulting from layering the wound materials.

* * * * *